(12) United States Patent
Harber et al.

(10) Patent No.: US 8,671,068 B2
(45) Date of Patent: Mar. 11, 2014

(54) CONTENT RECOMMENDATION SYSTEM

(75) Inventors: Dustin Harber, San Ramon, CA (US); Kentaro Oguchi, Menlo Park, CA (US)

(73) Assignee: Toyota Jidosha Kabushiki Kaisha, Toyota-Shi, Aichi-ken (JP)

( * ) Notice: Subject to any disclaimer, the term of this patent is extended or adjusted under 35 U.S.C. 154(b) by 252 days.

(21) Appl. No.: 13/240,802

(22) Filed: Sep. 22, 2011

(65) Prior Publication Data
US 2013/0080371 A1 Mar. 28, 2013

(51) Int. Cl.
*G06F 17/00* (2006.01)
*G06N 5/02* (2006.01)

(52) U.S. Cl.
USPC ............................................. 706/50

(58) Field of Classification Search
None
See application file for complete search history.

(56) References Cited

U.S. PATENT DOCUMENTS

| | | | |
|---|---|---|---|
| 6,192,340 B1 | 2/2001 | Abecassis | |
| 6,438,579 B1 | 8/2002 | Hosken | |
| 7,003,530 B2 | 2/2006 | Johnson | |
| 7,081,579 B2 | 7/2006 | Alcalde et al. | |
| 7,743,067 B2 * | 6/2010 | Ducheneaut et al. | 707/769 |
| 8,090,612 B2 * | 1/2012 | Chao et al. | 705/7.29 |
| 8,095,523 B2 * | 1/2012 | Brave et al. | 707/705 |
| 2006/0224798 A1 | 10/2006 | Klein et al. | |

FOREIGN PATENT DOCUMENTS

| | | |
|---|---|---|
| JP | 2003-150176 | 5/2003 |
| JP | 2007-303981 | 11/2007 |
| JP | 2008-126818 | 6/2008 |
| JP | 2008-176851 | 7/2008 |

\* cited by examiner

*Primary Examiner* — Michael B Holmes
(74) *Attorney, Agent, or Firm* — Patent Law Works LLP

(57) ABSTRACT

A system and method for in-vehicle content recommendation is disclosed. The system comprises an aggregator module, a modeler module and a recommendation module. The aggregator module aggregates content data describing content such as a music, a news program, a podcast, an audio book, a movie, a television program, etc. The aggregator module also aggregates situation data describing an environment in which the content was recommended to a user, and feedback data describing the user's response to the recommendation. The modeler module generates a content preference model. The content preference model represents the user's dynamic content preferences based at least in part on the aggregated data. The recommendation module generates a first content recommendation based at least in part on the content preference model.

17 Claims, 6 Drawing Sheets

CONTENT RECOMMENDATION SYSTEM

FIELD OF THE INVENTION

The specification relates to a system and method for making recommendations to a user. In particular, the specification relates to making content recommendations.

BACKGROUND

Activities such as searching for a favorite song or frequently changing radio stations distract a driver's attention and can cause accidents. For this and other reasons, systems for recommending music to drivers have become popular in the market. However, the existing music recommendation systems have numerous deficiencies and do not accurately recommend music that drivers want to listen to.

A first deficiency in existing recommendation systems is that they do not account for how a user's music preferences change depending on the environment in which the user listens to the music. These existing recommendation systems make music recommendations based merely on a user's static preferences regarding a set of music attributes (e.g., artist, genre, album, lyric type, instrument use, tempo, etc.). As a result, these systems recommend the same music over, and over again to the driver without considering other factors that affect which music the driver wants to listen to. Existing systems have no ability to consider external factors that influence a user's music preferences such as the driver's physical state, the driver's psychological state, the type of road the driver is driving on, the surrounding traffic, the time of day, the driver's routines, etc.

A second deficiency in existing recommendation systems is that they are not able to account for the fact that the music preference of the driver changes over time. These systems use models to generate their music recommendations, but these models do not change over time. Instead, they are static. As a result, the existing systems do not refine music recommendations by accumulating more and more data describing user's music preferences.

A third deficiency in existing recommendation systems is that they are not able to consider the affect of environmental factors such as the weather on a driver's music preferences. As a result, these existing recommendation systems are unable to improve the recommendation models based on environmental factors.

A fourth problem present with these systems is that they are limited to making only music recommendations. However, some users desire recommendations for other content such as news programs, podcasts, audio books, movies, television programs, etc.

SUMMARY OF THE INVENTION

The deficiencies and limitations of the prior art are overcome at least in part by providing a system and method for in-vehicle content recommendation that captures a user's dynamic content preferences. The system comprises an aggregator module, a modeler module and a recommendation module. The aggregator module aggregates content data describing content such as a music, a news program, a podcast, an audio book, a movie, a television program, etc. The aggregator module also aggregates situation data describing an environment in which the content was recommended to a user, and feedback data describing the user's response to the recommendation. The modeler module generates a content preference model. The content preference model represents the user's dynamic content preferences based at least in part on the aggregated data. The recommendation module generates a first content recommendation based at least in part on the content preference model.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
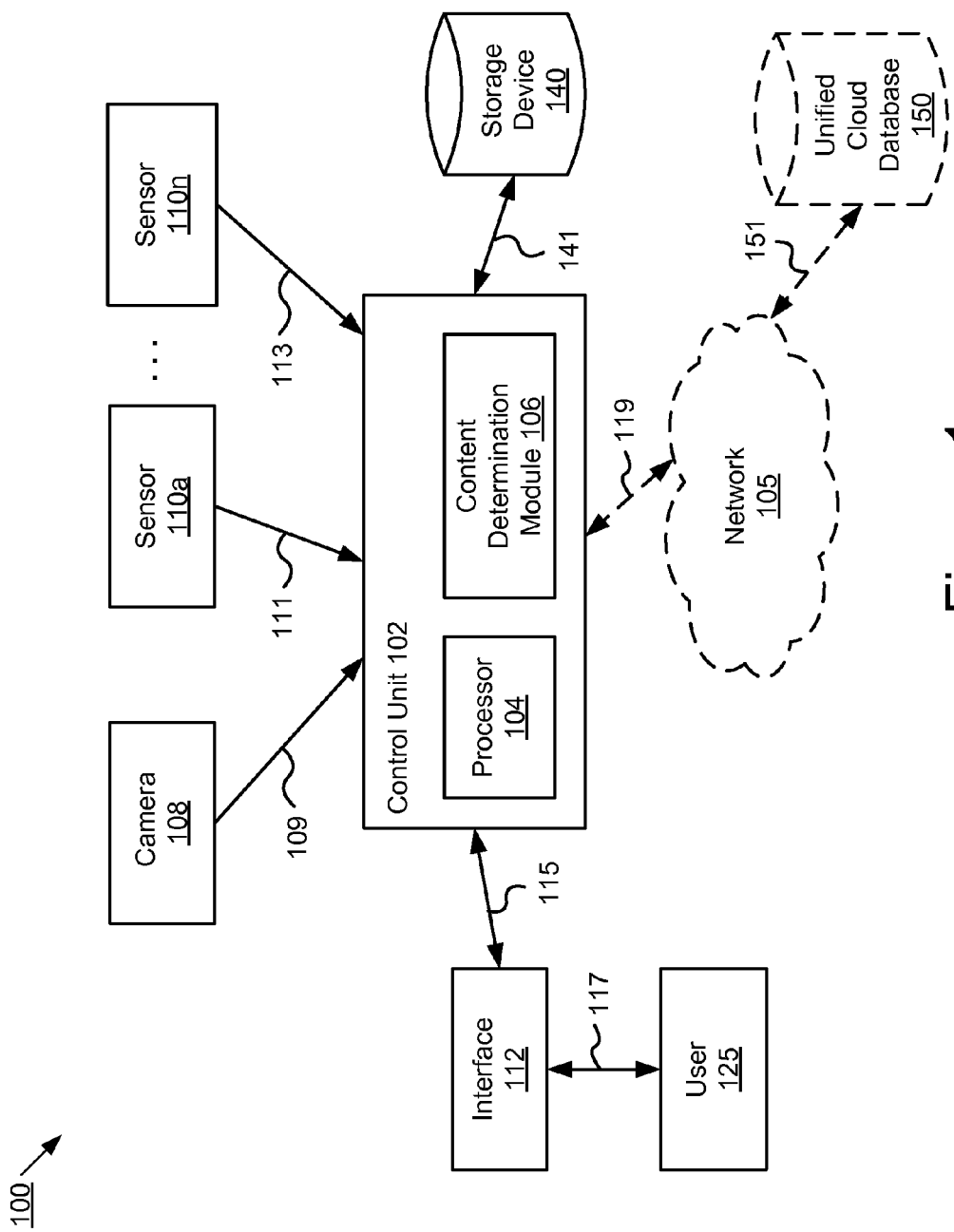
FIG. 1 is a high-level block diagram illustrating one embodiment of a system for in-vehicle content recommendation.

A system and method for in-vehicle content recommendation is described below. In the following description, for purposes of explanation, numerous specific details are set forth in order to provide a thorough understanding of the embodiments. It will be apparent, however, to one skilled in the art that the specification can be practiced without these specific details. In other instances, structures and devices are shown in block diagram form in order to avoid obscuring the embodiments. For example, one embodiment is described below with reference to user interfaces and particular hardware. However, the specification applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of content suitable for storing electronic instructions, each coupled to a computer system bus.

The embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the embodiments as described herein.

System Overview

FIG. 1 illustrates a block diagram of a system 100 for in-vehicle content recommendation according to one embodiment. The illustrated system 100 includes a control unit 102, a camera 108, sensors 110a and 110n (referred to individually or collectively as sensor 110), an interface 112, a user 125 and storage device 140. Although only two sensors 110a and 110n are illustrated, persons having ordinary skill in the art will recognize that any number of sensors 110n are available. Furthermore, while only one control unit 102, one camera 108, one interface 112, one user 125 and one storage device 140 are depicted in FIG. 1, the system 100 could include one or more control units 102, one or more cameras 108, one or more interfaces 112, one or more users 125 and one or more storage devices 140.

In the illustrated embodiment, the camera 108 is communicatively coupled to the control unit 102 via signal line 109. The sensor 110a is communicatively coupled to the control unit 102 via signal line 111. The sensor 110n is communicatively coupled to the control unit 102 via signal line 113. The user 125 interacts with the interface 112 via signal line 117. The interface 112 is communicatively coupled to the control unit 102 via signal line 115. The storage device 140 is communicatively coupled to the control unit 102 via signal line 141.

In the illustrated embodiment, the system 100 further comprises a network 105 and a unified cloud database 150. The network 105 and the unified cloud database 150 are depicted in dashed lines to indicate that they are optional features of the system 100. The control unit 102 is communicatively coupled to the network 105 via signal line 119. The unified cloud database is communicatively coupled to the network 105 via signal line 151.

The camera 108 is an optical system for recording images. For example, the camera 108 takes pictures of roads, traffic lights, vehicles, etc. external to a vehicle as the vehicle is driven down a road. In one embodiment, the camera 108 captures images and stores the images in the storage device 140.

The sensor 110 is any type of conventional sensor configured to collect any type of data. For example, the sensor 110 is one or more of the following: a radar; a light detection and ranging (LIDAR) sensor; an infrared detector; a motion detector; etc. Persons having ordinary skill in the art will recognize that other sensors are possible. In one embodiment, the sensor 110 measures conditions relating to a vehicle associated with the sensor (i.e., "a vehicle condition"). For example, the sensor 110 measures the direction, speed and acceleration of the vehicle. In another embodiment, the sensor 110 measures conditions external to the vehicle. For example, the sensor 110 measures the external temperature, moisture, etc. In yet another embodiment, the sensor 110 measures conditions internal to the vehicle. For example, the sensor measures the temperature inside the vehicle, if fog lights are on, if windshield wipers are on or if the passenger seat is occupied based on weight in the seat.

In one embodiment, the sensor 110 measures physical and/or physiological conditions of the user 125. For example, the sensor 110 measures one or more gestures by a user 125. A gesture is a movement by the user 125. For example, a gesture is a combination of one or more hand movements and head movements by the user 125. The sensor 110 is communicatively coupled to communicate gesture data describing a detected gesture to the control unit 102. The control unit 102 receives the gesture data and determines a physical and/or physiological condition of the user based at least in part on the gesture data. For example, the control unit 102 determines that the physical condition of the user 125 is tired based at least in part on the gesture data (e.g., eye blinking rate, yawning or head-bobbing, etc.).

In yet another embodiment, the sensor 110 provides data in any combination of the above-described embodiments. In one embodiment, the sensor 110 measures gesture data and stores the gesture data in the storage device 140.

The interface 112 is a hardware device configured to receive and communicate inputs received from the user 125 to the control unit 102. For example, the interface 112 includes an in-vehicle touch screen for receiving inputs from the user 125, a microphone for capturing voice commands from the user 125, etc. In one embodiment, the interface is also configured to communicate an output from the control unit 102 to the user 125. For example, an audio system to play content or a touch screen to display a content recommendation. One having ordinary skill in the art will recognize that other types of interfaces 112 and inputs are possible.

Content, as used herein, includes any type of content. Content can be audio content (such as a song) or audio-video content (such as a movie). For example, content includes music, a podcast, an audio news program, an audio book, movies, television shows, user-generated content such amateur generated videos that are hosted by a video hosting site, etc. For the purpose of clarity, the examples given below deal mainly with music content such as songs and albums. However, a person having skill in the art will appreciate that the system 100 can make recommendations for other types of content without deviating from the teachings provided herein.

The user 125 is a human user. In one embodiment, the user 125 is a driver or a passenger in a vehicle that is capable of interacting with, or otherwise providing input to, an interface 112, which sends and receives different types of data to and from the control unit 102. For example, the interface 112 is a touch screen and the user 125 touches a portion of the touch screen with a finger or a stylus. By this input the user 125 selects a "request content" field. Responsive to this input, the interface 112 sends a user request for a content recommendation to the control unit 102.

The storage device 140 is a non-transitory memory that stores data. For example, the storage device 140 is a hard drive, flash drive, etc. The storage device 140 is described in more detail with reference to FIG. 2.

The optional network 105 is a conventional type of network, wired or wireless, and may have any number of configurations such as a star configuration, token ring configuration or other configurations known to those skilled in the art. In one embodiment, the network 105 comprises one or more of a local area network (LAN), a wide area network (WAN) (e.g., the Internet) and/or any other interconnected data path across which multiple devices communicate. In another embodiment, the network 105 is a peer-to-peer network. The network 105 is coupled to or includes portions of a telecommunications network for sending data in a variety of different communication protocols. For example, the network is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 105 are encrypted using conventional encryption technologies such as secure sockets layer (SSL), secure HTTP and/or virtual private networks (VPNs).

The optional unified cloud database 150 is an online database accessible from the network 150. For example, the unified cloud database 150 is a database where data is stored on multiple virtual servers hosted by different companies. In one embodiment, the unified cloud database 150 stores any data required for providing the functionality of the system 100.

The control unit 102 is an electronic device for generating a content recommendation. For example, the control unit 102 is an engine control unit ("ECU") implemented in a vehicle. In one embodiment, the control unit 102 generates a content recommendation for the user 125 using any combination of feedback data, image data and sensor data. The feedback data is data received from the user 125 via the interface 112. The image data is data received from the camera 108. The sensor data is data received from the sensor 110. The sensor data can include, among other things, the gesture data described above with reference to sensor 110. The control unit 102 retrieves data from the storage device 140 via signal line 141.

In one embodiment, the control unit 102 comprises a processor 104 and a content determination module 106. The content determination module 106 is described in more detail below with reference to FIGS. 3, 5 and 6.

The processor 104 comprises an arithmetic logic unit, a microprocessor, a general purpose controller or some other processor array to perform computations, retrieve data stored on the storage device 140, etc. Processor 104 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

Existing recommendation systems make content recommendations based only on feedback data. By contrast, the present system 100 generates content recommendations based on one or more of feedback data, image data and sensor data. In one embodiment, feedback data is used with at least one of the image data and the sensor data to determine a content recommendation. The feedback data includes data describing the user's 125 static content preferences. For example, the feedback data describes one or more artists, albums, songs and genres that are preferred by the user 125. However, such preferences often change depending on the vehicle's external environment. The image data and/or sensor data represent the environmental factors that influence the user's 125 content preferences. For example, assume that the user 125 normally likes slow, melancholy content, but when the user 125 drives on an open freeway with little traffic, the user 125 prefers faster, more upbeat content. The camera 108 collects image data indicating that the freeway has little traffic and is therefore open. The sensor 110 collects sensor data describing the speed of the vehicle. The camera 108 and the sensor 110 are communicatively coupled to the control unit 102 to communicate the image data and the sensor data to the control unit 102. The control unit 102 receives the image data and the sensor data. The control unit 102 uses the image data, sensor data and the feedback data to determine a content recommendation that includes faster and more upbeat content (e.g., a song having a fast beat, a movie including a thrilling scene, etc.). In other words, the present system 100 determines a content recommendation by capturing not only static content preferences, but also dynamic content preferences.

The present system 100 generates a content recommendation by learning a user's content preferences. The user 125 assesses content in a vehicle. For example, the user 125 provides an input indicating that the user 125 rejects a content recommendation from the control unit 102. This input from the user is an example of feedback data. The image data and the sensor data are captured by the camera 108 and the sensor 110, respectively. The camera 108 and the sensor 110 are communicatively coupled to the control unit 102 to send the image data and the sensor data to the control unit 102. The control unit 102 updates the stored feedback data, image data and sensor data with the feedback data, image data and sensor data received from the camera 108 and the sensor 110. The control unit 102 generates another content recommendation for the user 125. In one embodiment, this second content recommendation is based at least in part on the updated feedback data, image data and sensor data. By receiving additional feedback data, image data and sensor data, the control unit 102 obtains more data describing the user's 125 content preferences. The control unit 102 uses this data to generate a more accurate content recommendation. In other words, the present system 100 improves the content recommendation performance over time as the system 100 receives more inputs describing the user's 125 content preferences.

Storage Device 140

Figure 2:
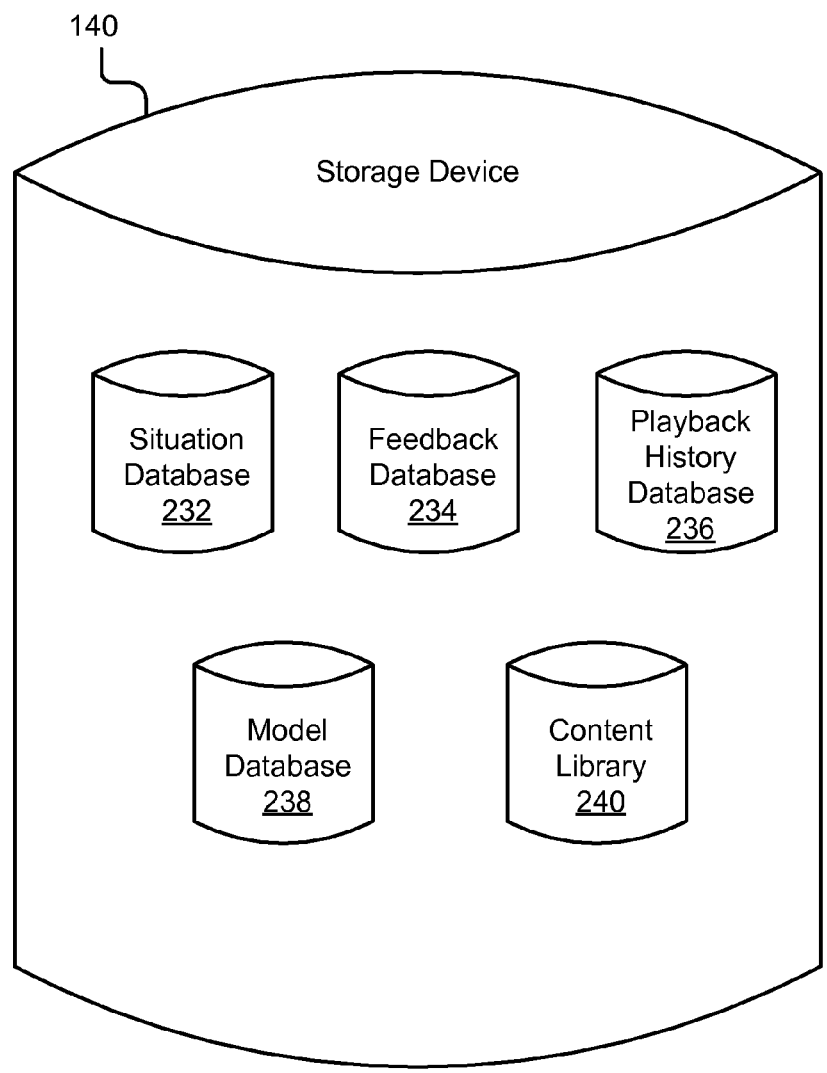
FIG. 2 is a diagram illustrating one embodiment of a storage device.

FIG. 2 depicts a storage device 140 according to one embodiment. The storage device 140 is a non-transitory computer-readable storage medium storing data and information used by the control unit 102 to provide the functionality of the control unit 102. The storage device 140 comprises one or more of a situation database 232, a feedback database 234, a playback history database 236, a model database 238 and a content library 240. In one embodiment, the situation database 232, the feedback database 234, the playback history database 236, the model database 238 and the content library 240 comprise one or more searchable databases that can be accessed by the control unit 102 to provide a service for a user. In one embodiment, the databases are comprised within one or more persistent and/or volatile memory devices (e.g., flash, RAM, hard drive, etc.). In one embodiment, the storage device 140 stores any type of content for playback to the user.

The situation database 232 is a storage system that stores any data and/or information captured by the camera 108, the sensor 110 or both. In one embodiment, the situation database 232 stores the image data received from the camera 108, the sensor data received from the sensor 110 or both. In another embodiment, the situation database 232 stores data resulting from processing the image data, the sensor data or both. In yet another embodiment, the situation database 232 stores any combination of the unprocessed image data, sensor data or both and the data resulting from the processing of the image data, sensor data or both. For example, the situation database 232 stores scene category information and condition data as situation data and situation feature vectors. The scene category information, condition data, situation data and situation feature vector are described in further detail below with reference to FIG. 3.

The feedback database 234 is a storage system that stores data received as input from the user 125. For example, the feedback database 234 stores the feedback data received from the user 125. In one embodiment, the feedback database 234 stores feedback data describing the user's 125 static content preferences. For example, the feedback database 234 stores data describing how the user 125 has rated content such as songs, albums, artists, podcasts, audio books, movies, television programs, television episodes, etc. The system 100 includes a graphic user interface ("GUI") used by the user 125 to rate content. The GUI is displayed on the interface 112. The user 125 interacts with the interface 112 to provide an input rating one or more of a song, album, artist, podcast, audio book, movie, television program, television episode, etc. The control unit 102 receives the input and stores the input in the feedback database 234.

In another embodiment, the feedback database 234 stores feedback data describing the user's 125 response to a content recommendation. For example, the feedback database 234 stores feedback data describing whether the user 125 approves or disapproves of the content recommendation, whether the user 125 plays back the content in its entirety after approving the content recommendation, how long the user 125 plays the recommended content, how the user 125 rates the content recommendation, etc. The user 125 interacts with the interface 112 to provide an input indicating his/her response to the content recommendation. The control unit 102 receives the input and stores the user response in the feedback database 234.

In yet another embodiment, the feedback database 234 stores feedback data describing a user request. A user request is an input provided by the user 125 in which the user 125 requests that the content determination module 106 generate and provide the user 125 with a content recommendation. The user 125 interacts with the interface 112 to input the user request. The control unit 102 receives the input and stores the user request in the feedback database 234.

The playback history database 236 is a storage system that stores data and/or information describing content that the user 125 previously played (i.e., the user's 125 playback history). In one embodiment, the playback history database 236 stores data associating different entries in the database with data stored in the situation database 232 and the feedback database 234. For example, the playback history database 236 stores data describing that the user 125 was listening to the song "Hotel California." Assume that the situation database 232 stores information describing how the user 125 was listening to this song on a Tuesday afternoon when the weather was rainy and the highway had heavy traffic. Assume that the feedback database 234 stores information describing how the user 125 was listening to this entire song. The playback history database 236 stores data associating the song "Hotel California" with these data stored in the situation database 232 and the feedback database 234. In the future, the user 125 provides an input requesting a content recommendation. It is a Tuesday afternoon, the weather is rainy and the traffic is heavy. The content determination module 106 recommends the song "Hotel California" responsive to the user request.

The model database 238 is a storage system that stores model data. The model data describes a content preference model used by the content determination module 106 to generate recommendations for the user 125. The model data is described in more detail below with reference to FIG. 3.

The content library 240 is a storage system that stores content data. The content data is data used to playback content (e.g., songs, albums, artists, podcasts, audio book movies, television programs, television episodes, etc.) and data that describes the content (e.g., the title of a song, the composer of the song, the song's artist, an album having the song, tempo, instrument use, the title of the podcasts, the subject of the podcast, author of an audio book, the genre of a audio book, movie or television program, etc.). Persons having ordinary skill in the art will recognize that other content data are possible and that other data describing the content are possible.

In one embodiment, the content library 240 is stored in the unified cloud database 150. For example, the content library 240 is part of an online content service that includes a cloud-based storage system that stores and streams content data (e.g., a content streaming service). In another embodiment, the content library 240 is a local content storage system including a user's 125 personal content collection.

Content Determination Module 106

Figure 3:
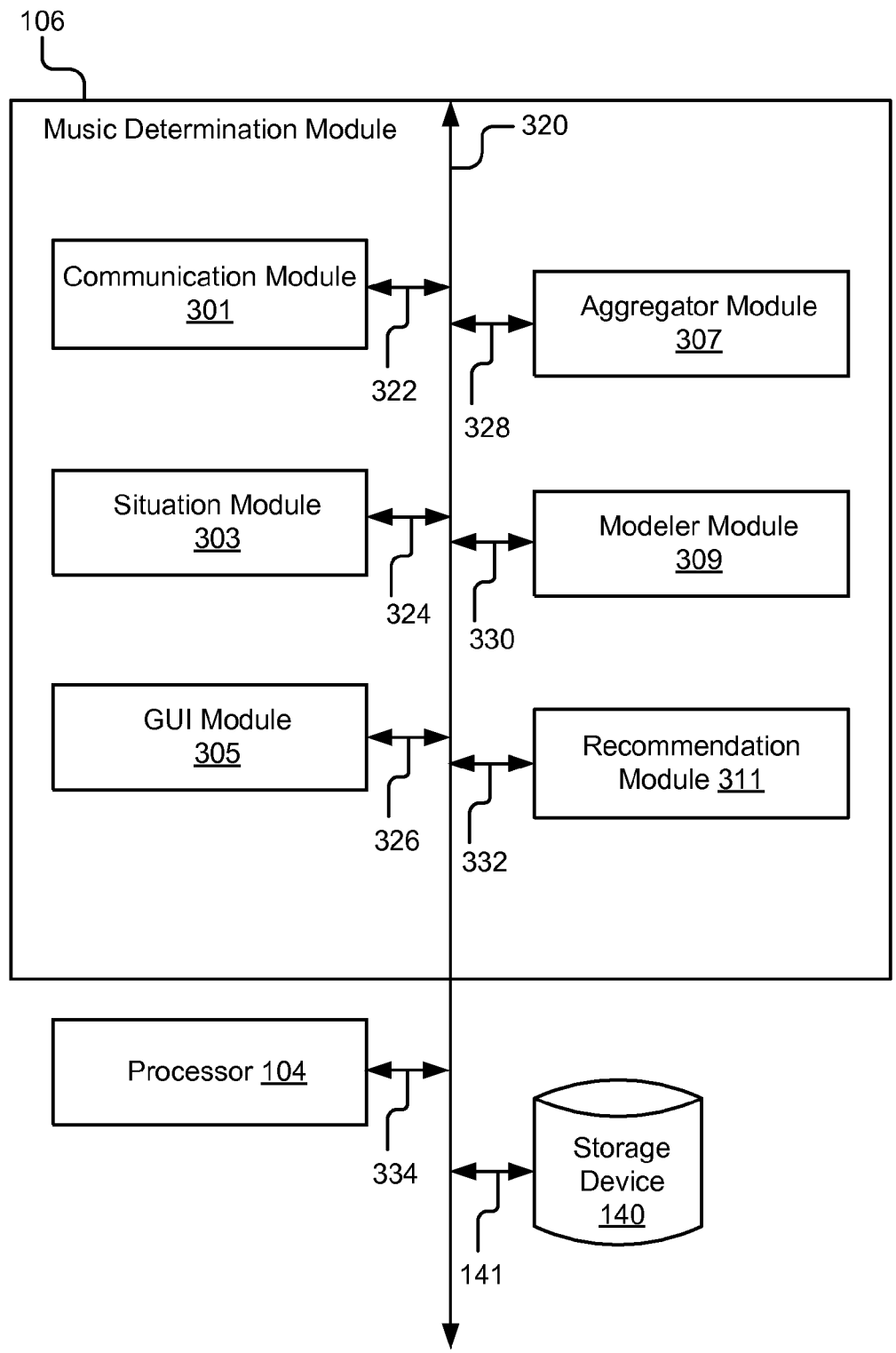
FIG. 3 is a block diagram illustrating one embodiment of a content determination module.

Referring now to FIG. 3, the content determination module 106 is shown in more detail. FIG. 3 is a block diagram of the storage device 140 and the content determination module 106 and the processor 104 of a control unit 102. The processor 104 is communicatively coupled to the bus 320 via signal line 334. The storage device 140 is communicatively coupled to the bus 320 via signal line 141.

The content determination module 106 comprises a communication module 301, a situation module 303, a graphical user interface (GUI) module 305, an aggregator module 307, a modeler module 309 and a recommendation module 311.

The communication module 301 is code and routines that, when executed by the processor 104, causes the communication module 301 to communicate with other devices. The content determination module 106 communicates with other devices via the communication module 301. For example, the communication module 301 communicates with the camera 108 and/or the sensor 110 and/or the user 125 via interface 112. The communication module 301 sends data to these other devices 108, 110, 112 and receives data and/or information from these other devices 108, 110, 112. In the depicted embodiment, the communication module 301 handles the internal communications among the components of the content determination module 106 via the bus 320 and the signal line 322. For example, the communication module 301 communicates with the situation module 303 and the aggregator module 307 to pass the output of the situation module 303 to the aggregator module 307. However, this description may occasionally omit mention of the communications module 301 for purposes of clarity and convenience. For example, for purposes of clarity and convenience, the above scenario may be described as the aggregator module 307 receiving the output of the situation module 303.

The situation module 303 is code and routines that, when executed by the processor 104, processes situation data. In one embodiment, the situation data is processed by generating a situation feature vector. The situation feature vector is a vector formed by vectorizing situation data and is discussed in detail below. The situation data is data describing environmental factors used in determining a content recommendation. The situation data can include two types of data: scene category information and condition data. The scene category information is data resulting from processing image data captured by the camera 108. The condition data is data resulting from processing sensor data measured by the sensor 110 and describes one or more conditions relating to the vehicle and/or the user 125.

In one embodiment, the situation module 303 performs image processing on image data retrieved from the situation database 232, classifies the scene in the images into a number of categories, and generates an array describing different categories of the scene (referred to herein as "scene category information"). In one embodiment, the scene category information includes information external to a vehicle. In one such embodiment, the categories of the scene include, but are not limited to, road type, traffic level, area type, etc. For example, the camera 108 captures images when the user 125 is driving a vehicle on a road and stores images in the situation database 232. The situation module 303 retrieves the image data from the situation database 232 via the communication module 301. The situation module 303 provides scene category information describing that the road is narrow, the road is on a beach, little traffic is on the road and the like based at least in part on processing the images. In one embodiment, the situation module 303 performs image processing with standard signal-processing techniques by treating the image as a two-dimensional signal. Persons having ordinary skill in the art will recognize that other image processing techniques are possible.

In one embodiment, the situation module 303 retrieves sensor data from the situation database 232, processes the sensor data and generates condition data describing one or more conditions relating to the vehicle and/or the user. The condition data represents environmental information of the user, which may include the environment internal and/or external to the vehicle.

The condition data, in one embodiment, includes data relating to the vehicle, for example, conditions describing vehicle's movement ("vehicle mobility condition"), weather condition, etc. The vehicle mobility condition includes, but is not limited to, information regarding one or more of the vehicle's speed, whether the vehicle is accelerating or decelerating and at what rate, how often the vehicle accelerates or decelerates, etc. The weather condition includes, by way of example and not limitation, one or more of the temperature, humidity, barometric pressure, windshield wiper status, fog light status, traction control status, etc. For example, from the retrieved sensor data, the situation module 303 determines that the vehicle mobility condition is that the vehicle is moving quickly and the weather condition is that the weather is hot (e.g., above 85° F.). The condition data, therefore, includes the information that the vehicle is moving quickly and the weather is hot.

The condition data, in one embodiment, includes data relating to the user, for example, the user's 125 physical condition, the user's 125 psychological condition, etc. For example, the situation module 303 retrieves the user's 125 gesture data from the situation database 232. The gesture data indicates that the user 125 has knocked the wheel twice in the past ten minutes. The situation module 303 determines that the user's 125 psychological condition is anxious based at least in part on the frequency of the user knocking the wheel as measured by the gesture data.

The situation module 303 processes the situation data comprising one or more of the scene category information and the condition data. The situation module 303, in one embodiment, processes the situation data by vectorizing the situation data and generating a situation feature vector. The vectorization of the situation data is accomplished by assigning a numerical value to each entry of the situation data and converting the situation data to a column or row vector using the numerical values. For example, assume the situation data in its simplest form includes the information that the traffic is heavy and the user 125 is tired. The situation module 303 assigns a first vector value to "1" to indicate that the traffic is heavy or the first vector value to "0" to indicate that the traffic is moderate or light. The situation module 303 assigns a second vector value to "4" to indicate that the user 125 is energetic, the second vector value to "3" to indicate that the user 125 is normal, the second vector value to "2" to indicate that the user 125 is tired and the second vector value to "1" to indicate that the user 125 is exhausted. According to these example values, the situation module 303 generates a situation feature vector [1 2] to indicate that the traffic on the road is busy and the user 125 is tired. Persons having ordinary skill in the art will recognize that the situation feature vector may include any number of values corresponding to other or different situation data. Moreover, persons having ordinary skill in the art will recognize that other value assignment rules for vectorization or other techniques for processing situation data may be applied without departing from the teachings of the specification.

In one embodiment, the scene category information describes the environmental information external to a vehicle. In one embodiment, the condition data describes the conditions relating to the vehicle and the user and, therefore, represents environmental information for the user, the internal of the vehicle and/or the external of the vehicle. The situation feature vector therefore, in one embodiment, includes environmental information regarding the internal of the vehicle, the external of the vehicle and the user.

Figure 4:
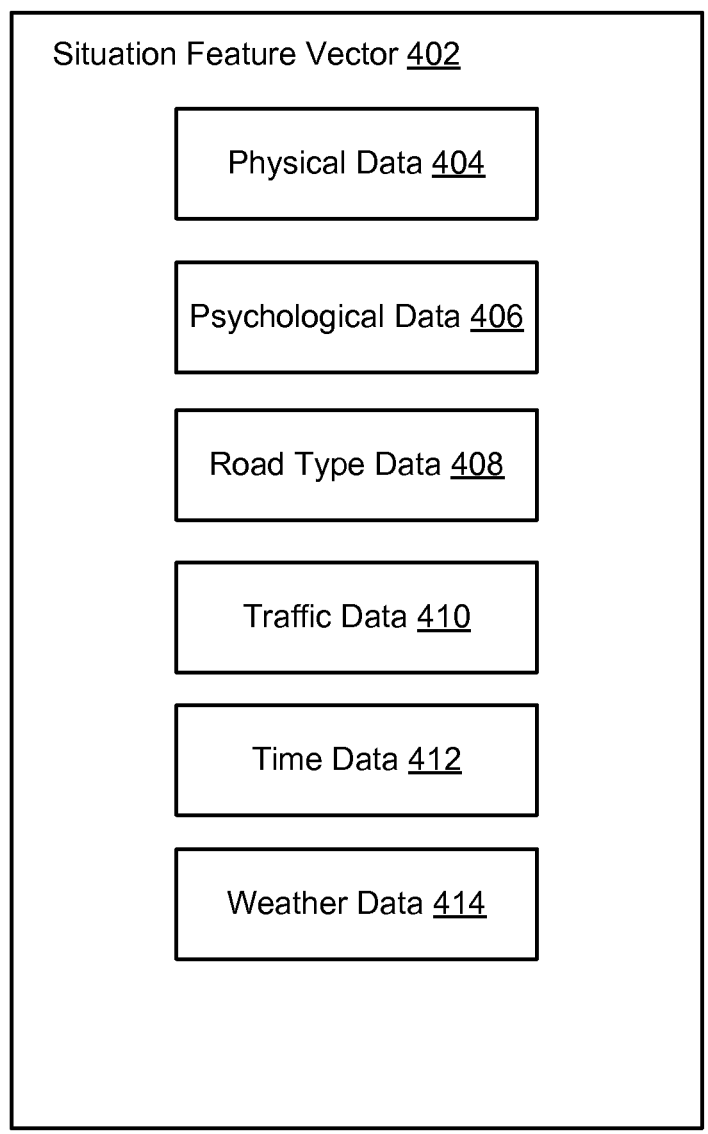
FIG. 4 is a diagram illustrating a situation feature vector.

Referring now to FIG. 4, one embodiment of the situation feature vector 402 is shown in more detail. FIG. 4 depicts an example embodiment of a situation feature vector 402 which includes vectorized physical data 404, psychological data 406, road type 408, traffic 410, time 412 and weather 414. A person having ordinary skill in the art will recognize that the situation feature vector may include other or different vectorized situation data. Moreover, a person having ordinary skill in the art will recognize that one or more of the listed types of situation data may comprise one or more vector values. For example, the weather 414 may have a single vector value (e.g., corresponding to temperature) or a plurality of vector values (e.g., corresponding to temperature, humidity and barometric pressure) depending upon the embodiment.

The physical data 404 and the psychological data 406 are condition data describing the user 125 and/or the user's environment. The physical data 404 is an indication of physical state of the user 125. For example, the physical data 404 indicates that the user 125 is tired. The psychological data 406 is an indication of psychological state of the user 125. For example, the psychological data indicates that the user 125 is happy. The road type data 408, traffic data 410, time data 412 and weather data 414 are environmental data describing the internal and external environment of the vehicle. For example, a situation feature vector is [1, 2, 3, 1, 8.12, 1]. The six values of this situation feature vector indicate that the user 125 is tired, the user 125 is happy, the road is a beach road, the road has heavy traffic, the time is 8:12 AM and the weather is hot, respectively. In one embodiment, the time 412 indicates when the data was recorded and serves as a time stamp for data aggregation implemented by the aggregator module 307, which is discussed below.

Referring back to FIG. 3, the situation module 303 is communicatively coupled to bus 320 via signal line 324. The situation module 303, in one embodiment, outputs a situation feature vector to the communication module 301 and the communication module 301 delivers the outputted situation feature vector to the aggregator module 307. In one embodiment, the situation module 303 also stores the situation data and/or the situation feature vector in the situation database 232.

The GUI module 305 is code and routines that, when executed by the processor 104, generates a graphical user interface ("GUI") for the user 125. In one embodiment, the GUI module 305 generates a GUI used by the user 125. The GUI is displayed on the interface 112. The user 125 interacts with the interface 112 to provide an input to the content determination module 106, which is received by the GUI module 305. In one embodiment, the input is feedback data describing the user's 125 static content preferences. For example, the GUI module 305 communicates with the interface 112 via the communication module 301 to receive feedback data from the user 125 describing how the user 125 has rated songs, albums, artists, podcasts, audio books, movies, television programs, television episodes, etc. In another embodiment, the input is feedback data describing a user request. For example, the GUI module 305 receives an input from the user 125 requesting that the content determination module 106 generate and provide the user 125 with a content recommendation. In yet another embodiment, the input is feedback data describing the user's 125 response to a content recommendation. For example, the GUI module 305 receives an input from the user 125 indicating that the user 125 disapproves of the content recommendation.

The feedback data is data received from the user 125. The feedback data influences a content recommendation. The feedback data includes a time stamp indicating when the feedback data was input by the user 125. In one embodiment, the feedback data is a user's response to a content recommendation and the feedback data is associated with a situation feature vector based on the time stamp.

In the depicted embodiment, the GUI module 305 is communicatively coupled to bus 320 via signal line 326. In one embodiment, the GUI module 305 receives feedback data and communicates the feedback data to the aggregator module 307. In another embodiment, the GUI model 305 also passes the feedback data to the recommendation module 311. In yet another embodiment, the GUI model 305 stores the feedback data in the feedback database 234.

The aggregator module 307 is code and routines that, when executed by the processor 104, aggregates feedback data (received from the GUI module 302 or retrieved from the feedback database 234), a situation feature vector (received from the situation module 303 or retrieved from the situation database 232) and content data (retrieved from the content library 240) to form aggregated data. The aggregated data is sent to the modeler module 309, stored in the playback history database 236 or both. In the depicted embodiment, the aggregator module 307 is communicatively coupled to bus 320 via signal line 328. In one embodiment, the aggregated data is a single row of data. The single row of data is data describing the user's 125 playback history, i.e., content that the user 125 previously played back. In one embodiment, the playback history includes additional data, e.g., data describing the situation in which the content was played and whether the user approved or disapproved of the content.

In one embodiment, the aggregator module 307 aggregates data by pairing the feedback data and the situation feature vector based at least in part on the time stamps contained in the feedback data and the situation feature vector and associating the pair with the content data of the content playing or being recommended when the feedback data was received. For example, the aggregator module 307 receives feedback data associated with a specific time stamp, chooses a situation feature vector having the same, or approximately the same, time stamp and combines the pair of the feedback data and the situation feature vector with content data describing the content recommended when the feedback data was received into a single row of data. By combining content data, feedback data with the situation feature vector (e.g., representing environmental factors), the system beneficially enables the generation of a content preference model that captures a user's 125 dynamic content preferences based at least in part on the aggregated data. Persons having ordinary skill in the art will recognize other aggregating techniques are possible.

The modeler module 309 is code and routines that, when executed by the processor 104, generates a content preference model. The content preference model is a model describing the user's 125 content preferences. The content preferences include static content preferences and dynamic content preferences. The static content preferences include the user's 125 preferences for one or more artists, albums, songs, genres, podcast subject matters, audio book authors, actors, directors, writers, etc. However, the user's 125 content preferences often change depending on environmental factors regarding the vehicle and/or the user 125. For example, assume the user 125 likes to listen to Broadway soundtracks alone (because the user 125 would be embarrassed if a passenger was present). The presence of the passenger does not change the user's 125 static preference (i.e., the user 125 still likes Broadway soundtracks); however, the user's 125 preference to hear a song from a Broadway soundtrack changes depending on whether a passenger is present (i.e., an environmental factor). The dynamic content preferences describe such preference changes. For another example, the user's 125 static content preferences indicate that the user 125 normally likes slow, melancholy content while the user's 125 dynamic content preferences indicate that the user 125 prefers faster, more upbeat content when driving on an open freeway with little traffic. Since the content preference model includes the user's 125 dynamic content preferences, the content preference model beneficially provides a more accurate content preference model is generated enabling more accurate recommendations to be made as compared to existing recommendation systems.

The modeler module 309 generates the content preference model by modeling the data retrieved from the playback history database 236. In one embodiment, the modeler module 309 receives data from the aggregator module 307 in addition to, or instead of, retrieving data from the playback history database 236. In one embodiment, the modeler module 309 retrieves rows of data associated with the user 125 from the playback history database 236, forms a matrix using the rows of data, performs latent semantic indexing on the matrix, identifies the user's 125 preferences in the relationships between the rows and columns contained in the matrix and represents the user's 125 preferences with a model. For example, assume that the modeler module 309 forms a matrix having the first row describing that the user 125 listened to the song "Hotel California" on a rainy Tuesday afternoon and the second row describing that the user 125 listened to the song "New Kid in Town" on a rainy Sunday morning based at least in part on the data retrieved from the playback history database 236. Since both songs are songs by the band "Eagles," the modeler module 309 identifies that the user 125 prefers to listen to Eagles' songs when driving on a rainy day. The modeler module 309 retains this preference in a content preference model. Persons having ordinary skill in the art will recognize that other techniques for generating a content preference model are possible.

The modeler module 309 outputs model data. The model data is data describing the user's 125 content preference model. In one embodiment, the model data is in the form of a table. For example, one row of the table has the following entries: classical content; symphony; and little traffic. This model data indicates one portion of the user's 125 content preferences. This portion of the user's 125 content preferences indicates that the user 125 prefers classical music such as a symphony when driving on a road with little traffic. Persons having ordinary skill in the art will recognize that other forms of model data are possible.

In the depicted embodiment, the modeler module 309 is communicatively coupled to bus 320 via signal line 330. In one embodiment, the modeler module 309 sends the model data to the recommendation module 311 via the communication module 301. In another embodiment, the modeler module 309 stores the model data in the model database 238. In yet another embodiment, the model data is both sent to the recommendation module 311 and stored in the model database 238.

The recommendation module 311 is code and routines that, when executed by the processor 104, makes a content recommendation for the user 125 using the model data received from the modeler module 309 or retrieved from the model database 238. In the depicted embodiment, the recommendation module 311 is communicatively coupled to bus 320 via signal line 332.

In one embodiment, the recommendation module 311 uses a method of cosine similarity to measure the similarities between the content in the content library 240 and the content described by the user's 125 content preferences in the form of the model data, find the content in the content library 240 most similar to the content described by the user's 125 content preferences and generate a recommendation for that content determined to be most similar to the user's 125 content preference. For example, assuming that the recommendation module 311 receives model data describing that the user 125 prefers classical content such as a symphony, the recommendation module compares the content in the content library 240 to the model data and determines a recommendation of Beethoven Symphony No. 9. Persons having ordinary skill in the art will recognize that other techniques for determining which content to recommend are possible.

The recommendation module 311 determines whether to generate a new content recommendation depending on the content of the feedback data received from the user 125. In one embodiment, the recommendation module 311 executes and generates a content recommendation in response to receiving feedback data in the form of a user request for a content recommendation. In another embodiment, the recommendation module 311 generates a content recommendation in response to receiving feedback data, e.g., the user's 125 response to a previous content recommendation. In one such embodiment, the recommendation module 311 generates a content recommendation if the user's 125 response in the feedback data was a disapproval.

If the recommendation module 311 generates a content recommendation, the recommendation module 311 passes this content recommendation to the communication module 301. The communication module 301 sends the content recommendation to the user 125 via the interface 112. In one embodiment, the recommendation module 311 automatically executes audio playback of the generated content recommendation. In another embodiment, the content recommendation is displayed to the user 125 through a GUI on the interface 112, and the user 125 must approve of the content recommendation to execute audio playback of the content recommendation.

Methods

Figure 5:
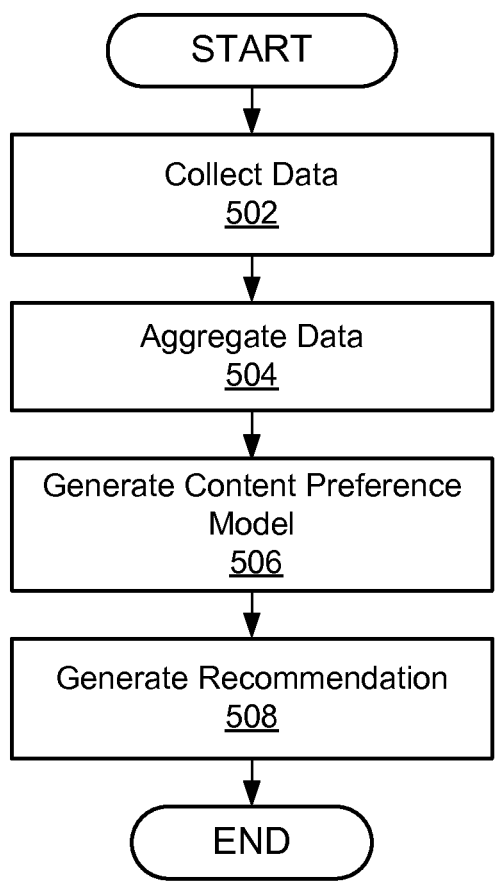
FIG. 5 is a flow diagram of one embodiment of a method for in-vehicle content recommendation.

Referring now to FIG. 5, depicted is a flow diagram of a method 500 for making a content recommendation to the user 125 according to one embodiment. The content determination module 106 collects 502 data from any combination of the camera 108, the sensor 110 and the user 125. In one embodiment, data is collected 502 responsive to user input, for example, feedback data comprising a user request for a content recommendation or a user acceptance, or rejection, of a previous content recommendation. As discussed above, the data collected 502 includes feedback data and situation data. As described above, the situation data includes scene category information (data resulting from images captured by the camera 108), condition data (data resulting from measurements of the sensor 110) or both.

The content determination module 106 aggregates 504 the data. In one embodiment, the situation data is processed (not shown) before aggregation 504, for example, the situation data is vectorized to create a situation feature vector. In one embodiment, the content determination module 106 aggregates 504 the data using timestamps to match feedback data with situation data having the same, or similar, timestamps. The aggregation 504 of feedback data (e.g., user 125 approval or disapproval) and situation data (representing environmental factors), captures the user's 125 dynamic content preferences in the aggregate data and beneficially enables the content determination module 106 to generate 506 a content preference model based at least in part on the aggregated data and, therefore, the user's 125 dynamic content preferences. The content determination module 106 generates 508 a content recommendation for the user 125 based at least in part on the content preference model.

Figure 6:
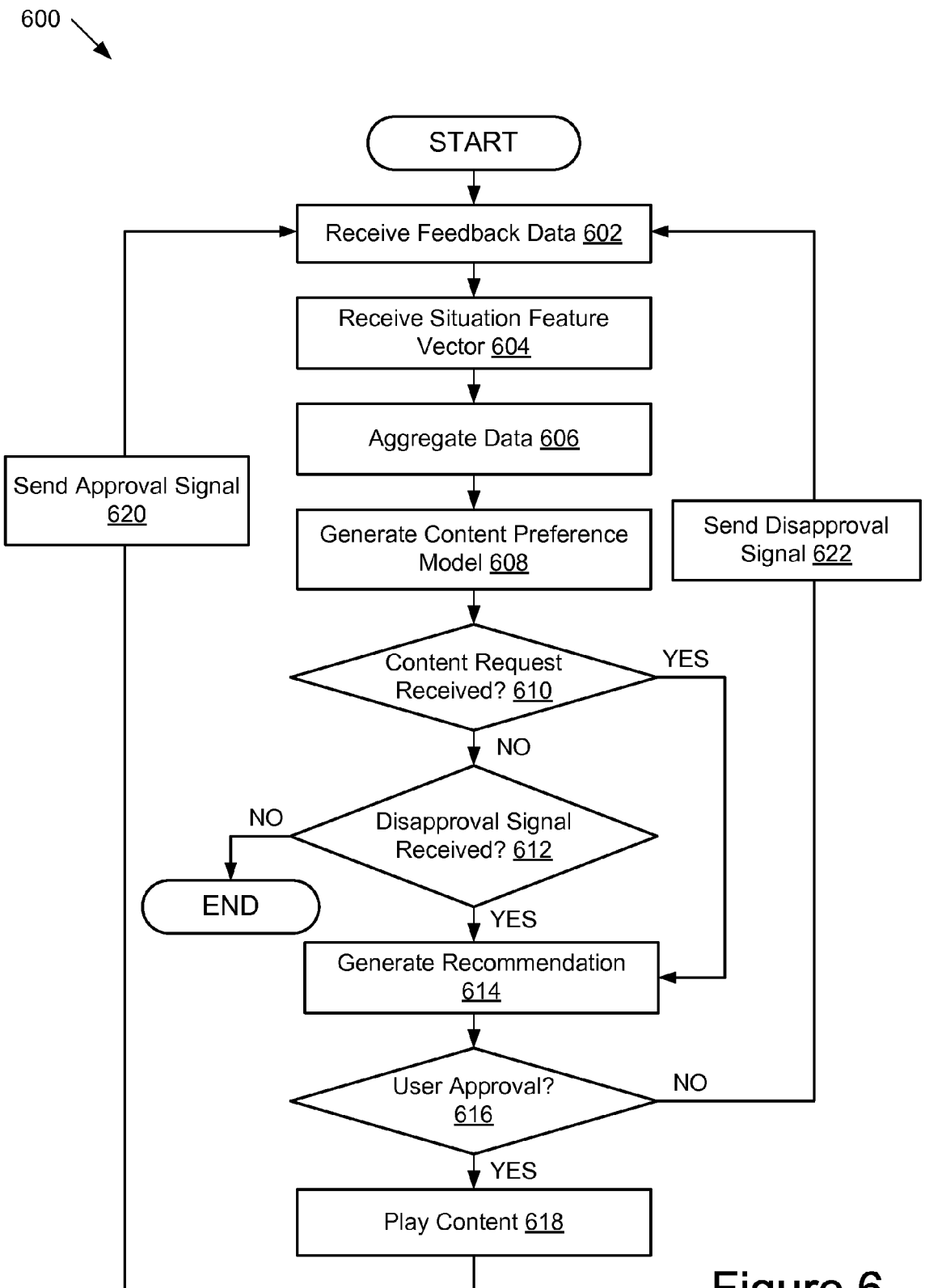
FIG. 6 is a flow diagram of another embodiment of a method for in-vehicle content recommendation.

Referring to FIG. 6, depicted is a flow diagram of another method 600 for making a content recommendation to the user 125 according to one embodiment. At step 602, the GUI module 305 receives 602 feedback data (e.g., a user request for content recommendation or an approval, or disapproval, of a content recommendation) from the user 125. In one embodiment, the GUI module 305 passes the feedback data to the aggregator module 307. In one embodiment, the GUI module 305 stores the feedback data in the feedback database 234

In one embodiment, responsive to feedback data being received by the GUI module 305, the situation module 303 receives image data from the camera 108, sensor data from the sensor 110 or both, and generates situation data therefrom (not shown). The situation module 303 vectorizes the situation data to create a situation feature vector (not shown). The situation module 303 sends the situation feature vector to the aggregator module 307 (not shown). In one embodiment, the situation module 303 stores the situation feature vector in the situation database 232 (not shown). At step 604, the aggregator module 307 communicates with the communication module 301 to receive 604 the situation feature vector from the situation module 303 or retrieve the situation vector from the situation database 232.

At step 606, the aggregator module 307 aggregates 606 the feedback data, the situation feature vector and content data to form aggregated data. The aggregation of content data (i.e., what was playing or recommended and its characteristics), feedback data (i.e., the user's response to the recommendation or what was playing) and a situation feature vector (i.e., the environmental conditions under which the user's 125 response to the content recommendation or playback occurred) serves as the basis for generating a content preference model that captures the user's 125 dynamic content preferences. In one embodiment, the aggregator module 307 stores the aggregated data in the playback history database 236. In another embodiment, the aggregator module sends the aggregated data to the modeler module 309.

At step 608, the modeler module 309 generates 608 a content preference model using the aggregated data retrieved from the playback history database 236 and/or received from the aggregator module 307. If the feedback data received at step 602 was a user's 125 response to a content recommendation, the aggregated data includes new information from the user 125, the camera 108 and/or the sensor 110 (i.e., the new feedback data and the new situation feature vector associated with the content data of the recommendation), the modeler module 309 generates a new content preference model based at least in part on the additional information. If the feedback data received at step 602 was a user request, in one embodiment, no new content preference model is generated. In one embodiment, the modeler module 309 passes the model data describing the content preference model to the recommendation module 311.

The recommendation module 311 determines whether to generate a new content recommendation depending on the content of the feedback data received in step 602. At step 610, the recommendation module 311 determines 610 whether feedback data received in step 602 was a user request for a content recommendation. The user request is a user input that causes the content determination module 106 to generate a content recommendation. If the feedback data received 602 was a user request, the method 600 moves to step 614. If the feedback data received 602 was not a user request, the method 600 moves to step 612.

At step 612, the recommendation module 311 determines 612 whether feedback data describing the user's 125 response was an approval or disapproval of the previous content recommendation. An approval signal indicates that the user 125 accepted or liked the previous content recommendation. In one embodiment, a user's 125 approval is implicit, e.g., if the user 125 playsback the content recommendation in its entirety, an approval signal is sent. In another embodiment, the user's 125 approval is explicit, e.g., if the user interacts with the interface 112 and selects a "thumbs-up" on the GUI, an approval signal is sent. A disapproval signal indicates that the user 125 rejected or disliked the previous content recommendation. In one embodiment, a user's 125 disapproval is implicit, e.g., if the user 125 uses the interface to select a "next track" button on the GUI, a disapproval signal is sent. In another embodiment, the user's 125 disapproval is explicit, e.g., if the user interacts with the interface 112 and selects a "thumbs-down" on the GUI, a disapproval signal is sent.

If a disapproval signal was not received (612—No), no new content recommendation is generated and the method 600 ends. In another embodiment, if a disapproval signal was not received (612—No), the user 125 plays back the recommended content. In one such embodiment, after the user 125 finishes playing the recommended content, the user 125 sends feedback data to the content determination module 106 describing whether the user 125 plays the entire content after approving the content recommendation, how long the user 125 plays to the recommended content, how the user 125 rates the content recommendation, etc. In another such embodiment, after playing to the recommended content a new content recommendation is made by moving to step 614 (not shown) or by automatically generating a new user request (not shown) restarting the method 600 step 602. If a disapproval signal is received (612—Yes), the method 600 moves to step 614.

At step 614, the recommendation module 311 generates 614 a content recommendation using the model data based on the content preference model generated in step 608 and received from the modeler module 309 or retrieved from the model database 238. In the method depicted, the recommendation module 311 generates 614 a content recommendation in response to the feedback response received 602 being either a user request for a content recommendation or a disapproval signal for a previous content recommendation. The recommendation module 311 sends (not shown) the content recommendation to the user 125 via interface 112 and the user responds (not shown) to the content recommendation with approval (explicit or implicit) or disapproval (explicit or implicit).

At step 616, the GUI module 305 determines 616 whether the user 125 approves of the new content recommendation. If the user 125 approves of the content recommendation (616—Yes), the content recommendation plays 618, and the GUI module sends 620 the feedback data comprising the approval signal to begin the method again at step 602. If the user 125 rejects (616—No) this new recommendation, the user 125 sends 622 the feedback data comprising a disapproval signal to begin the method again at step 602.

In the depicted method, every time feedback data including an approval signal or a disapproval signal is received, the system 100 updates the content preference model stored in the model databases 238 of the storage device 140 beneficially creating an increasingly accurate content preference model that includes a user's 125a dynamic content preferences. The system 100 also keeps generating new content recommendations based on the content preference model until the content determination module 106 receives feedback data including an approval signal from the user 125.

The foregoing description of the example embodiments has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for recommending content, the method comprising:
aggregating content data describing content, situation data describing an environment in which the content was recommended to a user, and feedback data describing the user's response to a content recommendation, the feedback data having a type that is one or more of a user request for a content recommendation; a user response that indicates that the user accepted a previous content recommendation; and a user response that indicates that the user rejected a previous content recommendation;
generating a content preference model that represents the user's dynamic content preferences based at least in part on the aggregated data; and
generating a first content recommendation based at least in part on the content preference model.

2. The method of claim 1, the method further comprising:
presenting the first content recommendation to the user;
receiving feedback data from the user; and
generating an updated content preference model responsive to receiving the feedback data.

3. The method of claim 2, wherein generating the updated content preference model further comprises:
receiving the feedback data including a type of feedback received from the user and a timestamp indicating when the feedback was received;
collecting new situation data from one or more of a sensor and a camera responsive to the new feedback data being received and having a timestamp proximate to the timestamp of the new feedback data;
receiving the content data associated with the first content recommendation when the new feedback was received;
aggregating the feedback data, the new situation data and the content data associated with the content recommendation to create new aggregated data; and
generating the updated content preference model based at least in part on the new aggregated data.

4. The method of claim 2, the method further comprising:
responsive to the feedback data indicating that the user rejected the first content recommendation, generating a new content recommendation based at least in part on the updated content preference model.

5. The method of claim 1, wherein the situation data is based at least in part on scene category information generated from data collected by a camera.

6. The method of claim 1, wherein the situation data is based at least in part on data collected from one or more of a sensor and a camera, and the situation data has been vectorized to create a situation feature vector.

7. A system for recommending content, the system comprising:
an aggregator module for aggregating content data describing content, situation data describing an environment in which the content was recommended to a user, and feedback data describing the user's response to a recommendation;
a modeler module for generating a content preference model that represents the user's dynamic content preferences based at least in part on the aggregated data; and
a recommendation module for generating a first content recommendation based at least in part on the content preference model; and
a GUI module for presenting the first content recommendation and receiving feedback data including a timestamp.

8. The system of claim 7, the system further comprising:
one or more of a camera and a sensor for capturing situation data describing the environment of a vehicle;
a situation module for collecting, responsive to the feedback data being received by the GUI module, situation data from one or more of the sensor and the camera having a timestamp proximate to the timestamp of the feedback data;
a content library storing the content data associated with the first content recommendation presented when the feedback was received by the GUI module;
a playback history database for storing aggregated data resulting from the aggregation of the feedback data, the situation data and the content data associated with the first content recommendation presented when the feedback was received by the GUI module by the aggregation module; and a model database for storing the content preference model based at least in part on the aggregated data and generated by the modeler module.

9. The system of claim 7, wherein the GUI module receives feedback data having a type that is one or more of:

a user request for the content recommendation;

a user response that indicates that the user accepted the first content recommendation; and a user response that indicates that the user rejected the first content recommendation.

10. The system of claim 7, wherein responsive to feedback data indicating that the user rejected the first content recommendation, the recommendation module generating a new content recommendation based at least in part on the updated content preference model.

11. The system of claim 7, wherein the situation data is based at least in part on scene category information generated by the situation module processing data collected by a camera.

12. The system of claim 7, wherein the situation data is based at least in part on data collected from one or more of a sensor and a camera, which has been vectorized by the situation module to create a situation feature vector.

13. A computer program product comprising a computer usable medium including instructions that, when executed by a computer, cause the computer to perform the steps comprising:

aggregating content data describing content, situation data describing an environment in which the content was recommended to a user, and feedback data describing the user's response to a content recommendation, the feedback data having a type that is one or more of a user request for a content recommendation; a user response that indicates that the user accepted a previous content recommendation; and a user response that indicates that the user rejected a previous content recommendation;

generating a content preference model that represents the user's dynamic content preferences based at least in part on the aggregated data; and generating a first content recommendation based at least in part on the content preference model.

14. The computer program product of claim 13, further comprise instructions for:

presenting the first content recommendation to the user;

receiving feedback data from the user; and generating an updated content preference model responsive to receiving the feedback data.

15. The computer program product of claim 14, wherein the instructions for generating the updated content preference model further comprise instructions for:

receiving the feedback data including a type of feedback received from the user and a timestamp indicating when the feedback was received;

collecting new situation data from one or more of a sensor and a camera responsive to the new feedback data being received and having a timestamp proximate to the timestamp of the new feedback data;

receiving the content data associated with the first content recommendation when the new feedback was received;

aggregating the feedback data, the new situation data and the content data associated with the content recommendation to create new aggregated data; and generating the updated content preference model based at least in part on the new aggregated data.

16. The computer program product of claim 14, the further comprising instructions for:

determining that the feedback data indicates that the user rejected the first content recommendation, and responsive to the determination, generating a new content recommendation based at least in part on the updated content preference model.

17. The computer program product of claim 13, wherein the situation data is based at least in part on scene category information generated from data collected by a camera.

* * * * *